May 14, 1968  R. ADELL  3,382,615
ORNAMENTAL AND PROTECTIVE MOLDING FOR MOTOR VEHICLE DOORS
Filed March 4, 1966
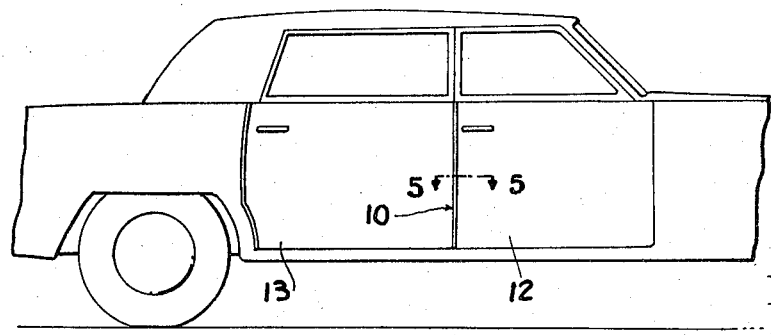
Fig. 1
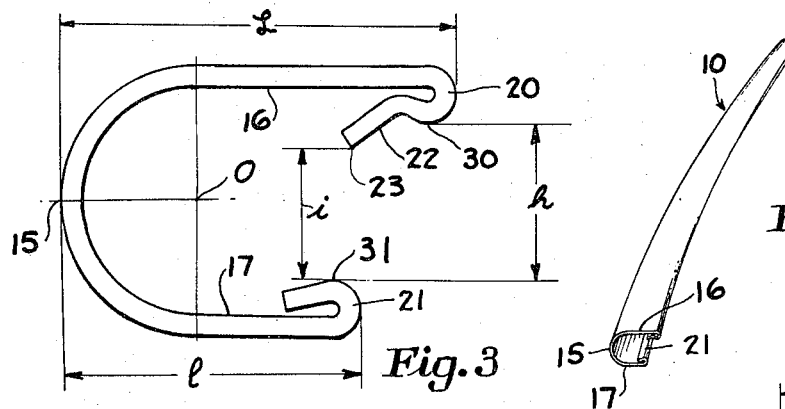
Fig. 3
Fig. 2
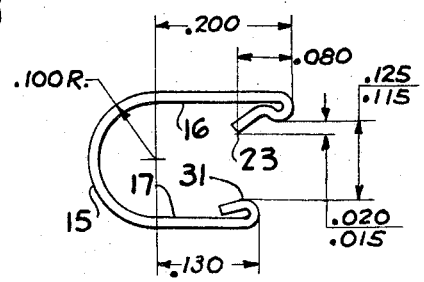
Fig. 6
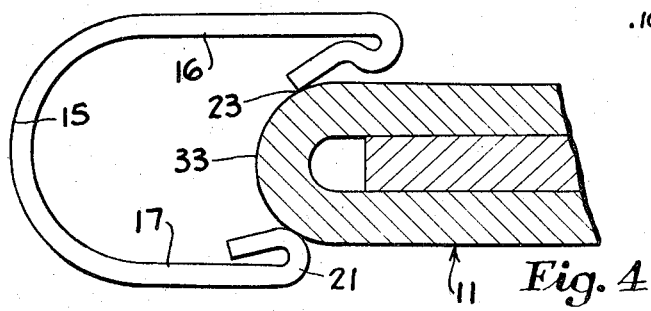
Fig. 4
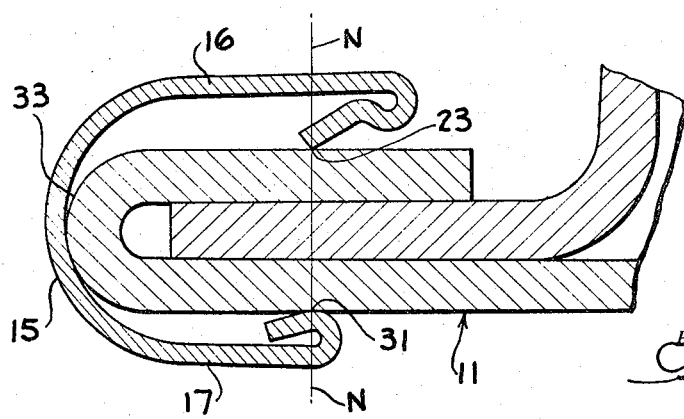
Fig. 5
INVENTOR.
ROBERT ADELL
BY
Gregory S. Dolgorukov
ATTORNEY United States Patent Office 3,382,615
Patented May 14, 1968

3,382,615
ORNAMENTAL AND PROTECTIVE MOLDING
FOR MOTOR VEHICLE DOORS
Robert Adell, 350 Billingsgate,
Birmingham, Mich. 48010
Continuation-in-part of application Ser. No. 496,606,
Oct. 15, 1965. This application Mar. 4, 1966, Ser.
No. 531,689
3 Claims. (Cl. 49—462)

ABSTRACT OF THE DISCLOSURE

A strip is provided for a vehicle door edge for ornamenting the edge and protecting the paint thereon from chipping. The strip is of U-shape cross section and its longitudinal length follows the shape of the door edge. The front leg of the U-section is reversely rolled to provide a line contact with the front surface of the door, the inner leg being reversely rolled and extended outwardly to provide a sharp edge located opposite to the front rolled edge in position to cut into the rear surface of the door edge and retains the strip locked thereon.

Background of the invention

The present application is a continuation-in-part of applicant's copending application, Ser. No. 496,606 filed on Oct. 15, 1965, for "Ornamental and Protective Molding for Motor Vehicle Doors." The molding is similar to that of applicant's Patents Nos. 2,887,338; 2,902,313 and 2,902,314 over which the present molding patentably distinguishes.

Summary of the invention

The molding strip is of U-section made from a resilient metal and shaped lengthwise to the vertical shape of the door edge. Inner and outer legs extend from the arcuate web portion of the strip with the ends reversely rolled over the adjacent sides of the legs. The inner leg extends outwardly beyond the outer leg which is therefor shorter than the inner leg. The edge section of the rolled portion of the inner leg is extended at an angle and directed toward the bottom of the outer leg to have a sharp corner of the edge pointing toward the rolled edge of the outer leg. The point of the sharp corner and the rolled edge of the outer leg are spaced a less distance apart than the thickness of the door edge. When the strip is assembled on the door edge, the point digs into the inner surface thereof throughout the length of the molding strip on a line opposite to the line of engagement of the rounded portion of the outer leg with the front surface of the door edge. In this manner, the strip is securely attached to the door edge without marring the paint on the front face thereof.

Brief description of the drawing

FIG. 1 is a fragmentary elevational view of a motor vehicle showing ornamental and protective molding, such as one embodying the present invention, applied at the trailing edge of the doors thereof.

FIG. 2 is a perspective view of the molding shown separately.

FIG. 3 is a transverse sectional view of the molding of FIG. 2 on an enlarged scale and in its free condition, i.e. prior to its application to the door edge.

FIG. 4 is a view similar in part of FIG. 3 showing application of the molding of the door edge at the start of the application operation.

FIG. 5 is a view similar in part to FIG. 4 but showing the molding fully applied to the door edge.

FIG. 6 is a view similar in part to FIG. 3 but showing, as an example, a dimensioned cross-section of one practical molding construction.

Description of the preferred embodiment

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

Referring specifically to the drawing, the ornamental and protective molding illustrated therein and generally designated by the numeral 10 is shaped to be applied to the lower portion of the trailing edge 11 of automobile doors such as 12 and 13. It will be understood that shaping of the molding includes not only providing therein a desired cross-section illustrated and described herein in detail, but also imparting to it longitudinal configuration corresponding to that of the door edge to which it is to be applied.

From an examination of FIG. 1 it will be understood that longitudinal configuration of the molding for the doors 12 and 13 must be different as resulting from the longitudinal configurations of the trailing edges of the respective doors. Since the present invention has a particular reference to cross-sectional construction of the molding, the present invention is illustrated and described with reference to the molding 10 applied to the door 12, it being understood that the same considerations are fully applicable to the molding for the door 13.

The molding it preferably made of resilient sheet metal such as spring steel, but other resilient materials may also be used.

As is best shown in FIG. 3, the molding 10 is of a generally U-shaped cross-section, with the connecting portion of the U being rounded as shown at 15, with the center of the curvature thereof appearing in FIG. 3 as the point O. The end edges of said portion 15 continue outwardly in tangential directions to form legs 16 and 17. The leg 17 as it appears in the drawing is the end view of the portion of the molding intended to be disposed on the outer side of the door edge 11, as shown in FIGS. 4 and 5. It is an important feature of the present invention that the leg 17 is shorter than the leg 16 in order to decrease to a practicable minimum the outer exposure of the molding, i.e. to make the same as narrow as possible without endangering its gripping action. On the other hand, the leg 16 is made as long as desired for the purposes of safe gripping action, and its length representing the width of the inner portion of the molding is not governed by appearance considerations, but is limited by the forming consideration as explained below.

I prefer to make the length of the leg 17, (including the radius of the rounded portion 15) indicated in FIG. 3 by the line $l$ to be less than ¼ of an inch. I have found that with the construction illustrated and described herein, the dimension $l$ of .230 of an inch produces a striking change in the appearance of the molding on the motor vehicle. Such a molding appears merely as a bright streak or line rather than a shiny molding of any appreciable width. On the other hand, the leg 16 is made longer for the reasons which will become clear as this disclosure develops further.

On the ends of the legs 16 and 17 (with the reference to cross-sectional view of the molding) there are provided rolled edges 20 and 21 extending inwardly of the U and thus providing well-rounded ends on said legs or well-rounded longitudinal edges on the molding, see FIG. 2. On the inner end of the rolled edge 20 there is provided an extension 22 extending, generally, toward the center O of the portion 15 or bottom of the leg 17 and having a sharp edge 23.

The trailing edge of the door usually includes three thicknesses of metal, as shown in FIGS. 4 and 5. With the single thickness of the metal being approximately .035"–.036", the total thickness of the door edge comes out, because of the manufacturing variations and other conditions to be .112" or larger. The dimensions of the molding are so selected that in the free or uninstalled condition of the molding the projected distance between points 30 and 31, i.e. the width of the "mouth" of the cross-section of the molding designated in FIG. 3 by the letter $h$, is slightly larger than the thickness of the door 11. On the other hand, the dimension indicated in FIG. 3 by the letter $i$, which is the "throat" of the cross-section or the projected distance between points 31 and 23 is somewhat less than the thickness of the door edge 11.

By virtue of such a construction, in application of the molding to the door edge, the door edge usually enters the mouth of the U more or less freely and contacts with its rounded portion 33 the extension 22. In the further movement of the door edge into the U, the extension 22 of the molding serves as a guiding ramp of the door edge 11, as is best shown in FIG. 4. As the door edge moves further into the molding, or the molding moves further on the door edge and contacts with the inner surface of its portion 15 the rounded end 33 of the door edge, the resilient molding is spread, and the points 31 and 23 exert resilient pressure on the respective surfaces on the door edge 11 which they contact. The point 31 representing a rounded edge of the molding, when sliding over the painted outer surface of the door does not cause any damage to such painted surface, which is an important advantage. On the other hand, the point 23 represents a sharp edge. However, since such edge contacts the surface of the door at a very flat angle, it usually does not damage the surface and cannot dig into the door edge surface to any appreciable degree in the process of this movement. In addition, the door surface in question is not exposed to view, and the scratches on such surface, should any occur, are concealed.

The molding in its applied condition is shown in FIG. 5. From an examination of said FIG. 5 it can be understood that tendency of the molding to come off the door edge 11 would cause the sharp edge 23 to dig into the door surface.

An important feature of the present invention resides in the construction of the molding ensuring that the contact lines of the molding 10 with the door edge 11 lie in the plane substantially normal to the general plane of the door edge. This feature is best shown in FIG. 5, wherein said lines of contact appear as points 31 and 23, with the line N—N representing said normal plane.

By the construction disclosed herein the best illustrated in FIG. 5 the force exerted by the molding on the door edge, as well as the reactive forces, lie in the plane normal to the general plane of the door edge and balance each other without producing any side component forces causing the difficulties explained above.

Furthermore, since the legs 16 and 17 of the cross-section of the molding are made, in effect, as equal in length as practicable without losing the above explained feature, no difficulties such as those encountered in forming molding with substantial difference in the lengths of its legs are encountered in forming my improved molding. As a result, in spite of the decreased width of the molding, particularly in its outer cross-sectional leg, the holding properties of my molding are not only unimpaired but on the contrary have shown considerably improvement.

FIG. 6 shows one dimensional cross-section of the molding, such as one disclosed above, which molding proved to give very satisfactory results, From an examination of said FIG. 6 it will be noted that the total length of the outer leg is only .230", which is less than ¼", while the total length of the longer inner leg such as leg 16 is FIG. 5 is .300" or approximately ⁵⁄₁₆ of an inch. The width of the mouth of the molding, i.e. the distance represented in FIG. 3 by the character $i$ is equal to .095"–.110" and, therefore, considering the thickness of the door edge to be .112" and over, smaller than said thickness. Thus tensioning of the molding in installation is ensured, as explained above. Other dimensions indicated in said FIG. 6 ensure performance of the molding in a manner disclosed above.

I claim:

1. An ornamental and protective molding for the trailing edge of an automobile door, said molding being made of resilient sheet metal and having its longitudinal configuration conforming to that of the trailing edge of the door and having a substantially U-shaped cross section providing an inner and outer leg to receive the door edge, the ends of the legs being reversely bent inwardly of the U-section to form rounded edges longitudinally of the molding with the outer leg shorter than the inner leg, and extension on the reversely bent end of the inner longer leg pointing toward the bottom of the outer leg to provide a sharp edge disposed in position to contact the inner side of the door edge and to dig thereinto when in installed position, the rounded edge of the outer leg being located opposite to said sharp edge in position to contact the outer surface of the door edge and exert pressure thereon, the cross sectional distance between said rounded portion of the front leg and the sharp edge of the rear leg before installation being smaller than the thickness of the trailing door edge.

2. An ornamental protective molding as recited in claim 1, wherein the lines of engagement of the molding with inner and outer sides of said door edge when in the installed position being in a plane substantially normal to the general plane of the door edge.

3. In an ornamental protective molding as recited in claim 1, wherein the engagement between the reversely bent rounded portion of the front leg and the sharp edge of the rear leg with the sides of the door edge occurs on lines substantially in the same plane normal to the sides of the door edge.

References Cited

UNITED STATES PATENTS

| 2,887,338 | 5/1959 | Adell | 49—462 |
| 2,902,313 | 9/1959 | Adell | 49—462 |
| 2,902,314 | 9/1959 | Adell | 49—462 |

FOREIGN PATENTS

| 191,604 | 10/1956 | Austria. |
| 632,590 | 5/1963 | Belgium. |

DAVID J. WILLIAMOWSKY, *Primary Examiner.*

PHILLIP C. KANNAN, *Assistant Examiner.*